G. R. KNOBELOCH.
NUT AND BOLT LOCK.
APPLICATION FILED APR. 13, 1908.
969,786.
Patented Sept. 13, 1910.
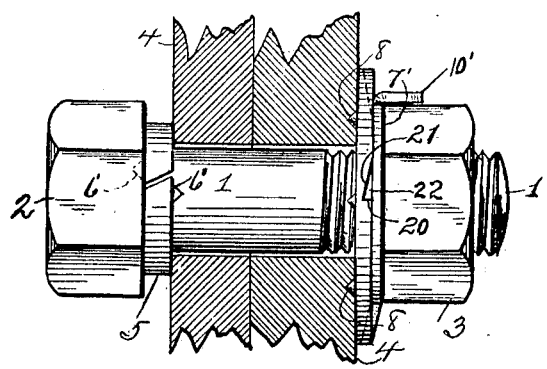
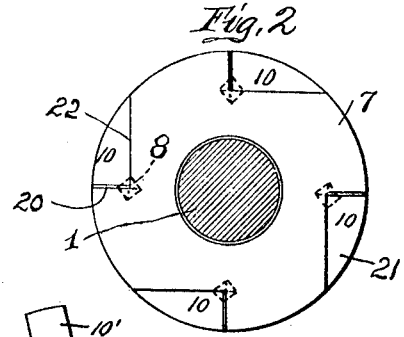

UNITED STATES PATENT OFFICE.

GEORGE R. KNOBELOCH, OF CORAOPOLIS, PENNSYLVANIA.

NUT AND BOLT LOCK.

969,786.  Specification of Letters Patent.  Patented Sept. 13, 1910.

Application filed April 13, 1908. Serial No. 426,646.

*To all whom it may concern:*

Be it known that I, GEORGE R. KNOBELOCH, a citizen of the United States, residing at Coraopolis, in the county of Allegheny and State of Pennsylvania, have invented certain new and useful Improvements in Nut and Bolt Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in nut and bolt locks; and it consists in the certain details of construction and combination of parts, as will be fully described hereinafter.

In the accompanying drawings:—Figure 1 is a side elevation of my improved nut and bolt lock, the same being constructed and arranged in accordance with my invention. Fig. 2 is a front sectional elevation of the same, the nut and front washer being removed therefrom. Fig. 3 is a perspective view of the spring washer used for locking the bolt to the article on which it is used. Fig. 4 is a face view of the outer locking washer.

To put my invention into practice and thereby provide a nut and bolt lock, I provide a bolt 1 having a head 2 and threaded portion upon which the nut 2 is operated, the said bolt and parts being of ordinary standard make. To lock the bolt to prevent turning I employ a divided spring washer 5, the division being made at an angle, to form acute-angles or sharp edges 6, and the said washer given a slight twist to form one coil of a helical spring. By this construction of a spring washer one of the angles 6 engages with the inside face of the head 2, and the other angle with the object 4 to which the bolt is applied, the said angle 6 entering the metal by the strain placed upon the bolt by the nut 3, when the latter is screwed tightly in position. To further prevent the bolt from turning, small barbs 6' are formed on opposite sides of the washer 5 which enter the head and the work.

To lock the nut to prevent the same from turning or becoming loose, I provide a washer 7, capable of being placed over the threaded end of the bolt 1, and having formed on its rear surface or that next the work 4, a series of barbs 8, and on the reverse side a series of angular pockets 10, forming a ratchet, said barbs alining with the pockets and oppositely positioned. Arranged at the front of the above-described washer 7, is another washer 7', formed with outwardly-projecting tongues 10', one of which will engage with one angular pocket 10 and the other adapted to be bent over the nut 3, as shown at Fig. 1, of the drawings. The angular pockets 10, as shown, are each provided with a square radial shoulder 20 alining with the barbs 8, each also having a sloping bottom 21 and tapering side wall 22, said pockets lying open at the periphery of the washer. Said side walls and shoulder are disposed perpendicularly with respect to each other, the pockets being arranged in pairs and oppositely extending, with alining shoulders diametrically-disposed.

In operation the two washers 7 and 7', are arranged in position, as above described and the nut 3 screwed in place. As the nut 3 is tightened, the barbs 8 engage with the work 4 by being forced therein by the pressure of said tightened nut. One of the tongues 10' is bent into its registering pocket 10, and the other bent over the side of the nut 3, thereby locking said nut to prevent turning of the same in one direction by reason of the contacting of one tongue 10' of the washer 7' with the radial shoulder 20 of the washer 7. A turning of the nut in the opposite direction is permitted by allowing the said tongue 10' to leave the pocket 10 by sliding over the sloping bottom 21 and tapered side 22 thereof in a ratchet like movement.

Having thus described my invention, what I claim, and desire to secure by Letters Patent, is:—

A device of the class described comprising a bolt and a washer positioned thereon, said washer provided with equally-spaced barbs on the inside face thereof, pockets formed in the outer face of said washer equal in number to said barbs, each of said pockets having a square radial shoulder and a sloping bottom and a tapering side wall, the side wall and shoulder of each pocket being perpendicularly arranged, said pockets being arranged at equal distances around and opening at the periphery of said washer and the directions of length of the pocket bottoms being the same with respect to the shoulders in each of the successive pockets, said shoulders alining and being diametrically-disposed, a set nut upon said bolt, a second washer rotatable in but a single direction and outward projecting opposite radial tongues carried thereby for engaging in said pockets and with said nut.

In testimony whereof, I affix my signature, in presence of two witnesses.

GEORGE R. KNOBELOCH.

Witnesses:
WM. G. WALTER,
THOMAS E. REDDY.